No. 746,981.

Patented December 15, 1903.

UNITED STATES PATENT OFFICE.

CARL LUDWIG MÜLLER, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN.

ACRIDIN DYE AND PROCESS OF MAKING SAME.

SPECIFICATION forming part of Letters Patent No. 746,981, dated December 15, 1903.

Application filed September 22, 1903. Serial No. 174,202. (No specimens.)

*To all whom it may concern:*

Be it known that I, CARL LUDWIG MÜLLER, doctor of philosophy and chemist, a subject of the King of Bavaria, residing at Ludwigshafen-on-the-Rhine, in the Kingdom of Bavaria, Empire of Germany, have invented new and useful Improvements in Acridin Coloring-Matters and Processes of Making the Same, of which the following is a specification.

I have discovered that certain amido-acridin compounds—such, for example, as acridin yellow, benzoflavin, and amido-benzoflavin obtained from meta-nitro-benzaldehyde and metatoluylenediamin, (see specification of Letters Patent No. 395,080,) as also the hydrochlorids of the leuco compounds of such compounds—can be converted by heating with glycerin into new coloring-matter. Any suitable proportion of glycerin can be used—for example, an amount equal to or double the weight of the initial material employed—and the whole heated for several hours to a temperature of from, say, 150° to 180° centigrade.

My new coloring-matter dyes cotton mordanted with tannin orange to orange-yellow shades and is especially characterized by the fact that its solution in concentrated sulfuric acid (containing ninety-six per cent. of $H_2SO_4$) becomes on heating at a temperature of 100° centigrade green, which green color remains after the solution has become cold.

The following examples will serve to further illustrate the nature of my invention; but it is not confined to these examples. The parts are by weight.

*Example 1—Coloring-matter obtained from acridin-yellow and glycerin.*—Heat together ten (10) parts of acridin-yellow and twenty (20) parts of glycerin in an enameled vessel provided with an oil-bath for from four to six (4–6) hours at a temperature of from one hundred and seventy to one hundred and eighty degrees centigrade, (170°–180° centigrade.) At the end of this period dissolve the melt into two hundred (200) parts of boiling water and add common salt to the solution thus obtained. The coloring-matter separates out in a resinous form. After removing the mother-liquor add seven (7) parts of hydrochloric acid containing about thirty-two (32) per cent. of HCl) and dry at a temperature of the boiling-water bath. In a state of fine division the new coloring-matter is a red-brown powder. Unlike acridin-yellow it is easily soluble even in cold water, giving an orange-yellow solution. It dissolves in concentrated sulfuric acid containing ninety-six (96) per cent. of $H_2SO_4$, yielding a brown solution with a green fluorescence. It dyes cotton mordanted with tannin and also leather in orange-yellow shades.

*Example 2—Coloring-matter from benzoflavin and glycerin.*—Heat ten (10) parts of benzoflavin with fifteen (15) parts of glycerin for five (5) hours at a temperature of from one hundred and sixty-five to one hundred and seventy degrees centigrade, (165°–170° C.) Dissolve the melt in about one thousand (1,000) parts of boiling water with the addition of two (2) parts of hydrochloric acid containing about thirty-two (32) per cent. of HCl. Filter the solution and work it up as explained in example 1. The coloring-matter so obtained when finally divided is an orange-yellow powder and is more difficultly soluble in water than the new coloring-matter of example 1. Its aqueous solution is red yellow and the solution in concentrated sulfuric acid containing ninety-six (96) per cent. of $H_2SO_4$ bright yellow, with a green fluorescence. It dyes cotton mordanted with tannin and leather vivid yellow-orange shades.

*Example 3—Coloring-matter from meta-amido-benzoflavin and glycerin.*—Heat together eighty (80) parts of the aforementioned meta-amido-benzoflavin and one hundred and sixty (160) parts of glycerin for three (3) hours at a temperature of from one hundred and sixty-five to one hundred and seventy degrees centigrade, (165°–170° C.) Dissolve the melt in three thousand two hundred (3,200) parts of boiling water with the addition of five (5) parts of hydrochloric acid containing about thirty-two (32) per cent. of HCl. Filter and precipitate the coloring-matter by means of common salt. The coloring-matter so obtained is easily soluble in water and dyes cotton mordanted with tannin orange yellow.

In place of either the acridin-yellow, the benzoflavin, or the amido-benzoflavin mentioned in the above examples the hydrochlorids of the corresponding leuco compounds can be heated with glycerin. The procedure is similar to that hereinbefore mentioned.

I claim—

1. The process of manufacturing acridin coloring-matter by heating an amido-acridin compound with glycerin.

2. The process of manufacturing acridin coloring-matter by heating an acridin-yellow compound with glycerin.

3. New acridin coloring-matter such as can be obtained by heating an amido-acridin compound with glycerin, which dyes tannin-mordanted cotton orange to orange-yellow shades, and whose solution in concentrated sulfuric acid becomes green on heating to a temperature of about 100° centigrade, which green color remains after the solution has become cold.

4. New acridin coloring-matter such as can be obtained by heating an acridin-yellow compound with glycerin, which dyes tannin-mordanted cotton orange-yellow shades, whose solution in concentrated sulfuric acid becomes green on heating to a temperature of about 100° centigrade, which green color remains after the solution has become cold.

In testimony whereof I have hereunto set my hand in the presence of two subscribing witnesses.

CARL LUDWIG MÜLLER.

Witnesses:
 JOHN L. HEINKE,
 JACOB ADRIAN.